(12) United States Patent
Miyashita et al.

(10) Patent No.: US 6,597,079 B2
(45) Date of Patent: Jul. 22, 2003

(54) INTERIOR PERMANENT MAGNET SYNCHRONOUS MOTOR

(75) Inventors: Toshihito Miyashita, Toshima-ku (JP); Satoru Onodera, Toshima-ku (JP); Manabu Matsushita, Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/951,282

(22) Filed: Sep. 13, 2001

(65) Prior Publication Data

US 2002/0047432 A1 Apr. 25, 2002

(30) Foreign Application Priority Data

Sep. 13, 2000 (JP) ........................................ 2000-277693

(51) Int. Cl.$^7$ ............................. H02K 21/16; H02K 1/14
(52) U.S. Cl. ................................. 310/156.48; 310/216
(58) Field of Search ............................ 310/216, 156.48, 310/156.61, 156.38, 156.58, 261, 264, 166, 168; 29/596–598

(56) References Cited

U.S. PATENT DOCUMENTS

| | | | | |
|---|---|---|---|---|
| 3,861,028 A | * | 1/1975 | Mittag | 29/598 |
| 6,008,559 A | * | 12/1999 | Asano et al. | 310/156 |
| 6,087,752 A | * | 7/2000 | Kim et al. | 310/156 |
| 6,133,662 A | * | 10/2000 | Matsunobu et al. | 310/156 |
| 6,429,565 B1 | * | 8/2002 | Matsunobu et al. | 310/156.38 |
| 6,441,522 B1 | * | 8/2002 | Scott | 310/156.23 |
| 6,445,100 B2 | * | 9/2002 | Tajima et al. | 310/156.57 |

FOREIGN PATENT DOCUMENTS

| | | |
|---|---|---|
| JP | 08-205499 | 8/1996 |
| JP | 08-256455 | 10/1996 |
| JP | 11-018328 | 1/1999 |

* cited by examiner

*Primary Examiner*—Tran Nguyen
(74) *Attorney, Agent, or Firm*—Rankin, Hill, Porter & Clark LLP (57) ABSTRACT

An interior permanent magnet synchronous motor wherein cogging torque and torque pulsation during feeding of electricity can be both restrained. 2p (p: a positive integer of 1 or more) magnetic salient pole sections consists of two groups of magnetic salient pole sections, a first group of which consists of p magnetic salient pole sections arranged so as to be spaced at equal intervals in the peripheral direction while having one magnetic salient pole section of a second group interposed between each of two adjacent magnetic salient pole sections, and the second group of which consists of p magnetic salient pole sections arranged so as to be spaced at equal intervals in the peripheral direction while having one magnetic salient pole section of the first group interposed between each of two adjacent magnetic salient pole sections. The open angle $\alpha 1$ of the p magnetic salient pole sections of the first group is smaller than the open angle $\alpha 2$ of the p magnetic salient pole sections of the second group. Then the open angles $\alpha 1$ and $\alpha 2$ are set to satisfy the expression $\alpha 2 - \alpha 1 \approx 2\beta - (2n-1)\tau s$. n is a natural number. $\beta$ is an angle between virtual center lines CL1 and CL2 of two adjacent magnetic salient pole sections which extend from the center of the shaft through the center of each salient magnetic pole sections. $\tau s$ is the slot pitch of the stator core.

16 Claims, 9 Drawing Sheets

| ROTOR TYPE | α1, α2 | R1, R2 |
|---|---|---|
| MODEL 1 | α1=α2=7.5° | R1=R2 |
| MODEL 2 | α1=7.5°, α2=15° | R1=R2 |
| MODEL 3 | α1=7.5°, α2=15° | R1<R2 |

INTERIOR PERMANENT MAGNET SYNCHRONOUS MOTOR

BACKGROUND OF THE INVENTION

This invention relates to an interior permanent magnet synchronous motor wherein a rotor core has a plurality of permanent magnets incorporated or embedded therein and includes magnetic salient pole sections defined between each two adjacent permanent magnets, and more particularly to a permanent magnet-equipped synchronous motor utilizing both reluctance generated due to the salient pole sections of the rotor core and torque by the permanent magnets.

One of conventional synchronous motors wherein a core between magnetic poles of permanent magnets is provided with magnetic salient pole sections is disclosed in Japanese Patent Application Laid-Open Publication No. 205499/1996. The synchronous motor is constructed in such a manner that rotation of a rotor is limited to only one direction, to thereby displace the silent pole sections, resulting in restraining generation of torque pulsation.

Also in Japanese Patent Application Laid-Open Publication No. 256455/1996 a technology in which generation of torque pulsation is restrained by changing the width of magnetic poles of magnetic salient pole sections of reluctance synchronous motor or by displacing a part of pairs of magnetic salient pole sections thereof in a peripheral direction is disclosed.

Another conventional synchronous motor having permanent magnets incorporated therein is disclosed in Japanese Patent Application Laid-Open Publication No. 18328/1999. The conventional synchronous motor disclosed is so constructed that a width of a core between magnetic poles of permanent magnets is set so as to establish relationship represented by the following expression, to thereby restrain generation of cogging torque:

$$\theta min \leq \theta \leq \theta max$$

In the conventional interior permanent magnet synchronous motor, the open angle θ of the rotor core between permanent magnet poles is defined to be within a range of $\theta min \leq \theta \leq \theta$ max determined depending on the number of teeth, a configuration thereof and a size thereof. However, a timing at which torque is generated between the magnetic poles of the permanent magnets is varied depending on "the number of slots per pole and per phase" q of a stator, so that the synchronous motor fails to satisfactorily restrain cogging torque and torque pulsation.

SUMMARY OF THE INVENTION

The present invention has been made in view of the foregoing disadvantage of the prior art.

Accordingly, it is an object of the present invention to provide a permanent magnet-equipped synchronous motor which is capable of sufficiently restraining both cogging torque and torque pulsation during feeding of electricity thereto.

In accordance with the present invention, a permanent magnet-equipped synchronous motor is provided. The permanent magnet-equipped synchronous motor includes a stator including a stator core provided with a plurality of magnetic pole sections having windings of at least one phase wound thereon, as well as a rotor having p pole pairs (p: a positive integer of 1 or more) The rotor includes a shaft and a rotor core fixed on the shaft. The rotor core has 2p (a plural number) permanent magnets incorporated therein in a manner to be spaced from each other at intervals in a peripheral direction thereof. The 2p permanent magnets each constitute a permanent magnet magnetic pole section formed on an outer periphery of the rotor core. The rotor is formed with 2p magnetic salient pole sections arranged so as to interpose the permanent magnet magnetic pole section therebetween. It is to be noted that herein "one permanent magnet" means not only one permanent magnet in physical sense, but also such "one permanent magnet" as comprises a plural permanent magnets and yet functions as one permanent magnet magnetically.

According to the present invention the 2p permanent magnet magnetic pole sections comprise two groups (a first and a second groups) of permanent magnet magnetic pole sections. Each permanent magnet magnetic pole section of the first group is arranged to be spaced at equal intervals in the peripheral direction interposing one permanent magnet magnetic pole section of the second group between each two adjacent permanent magnet magnetic pole sections. Similarly, each permanent magnet magnetic pole section of the second group is also arranged to be spaced at equal intervals in the peripheral direction interposing one permanent magnet magnetic pole section of the first group mentioned above between each two adjacent permanent magnet magnetic pole sections. In other words each permanent magnet magnetic pole section of the two groups is arranged to appear alternately in the peripheral direction.

Also the 2p (p: a positive integer of one or more) magnetic salient pole sections comprise two groups (a first and a second groups) of magnetic salient pole sections. Each magnetic salient pole section of the first group is arranged to be spaced at equal intervals in the peripheral direction interposing one magnetic salient section of the second group between each two adjacent magnetic salient pole sections. Similarly, each magnetic salient pole section of the second group is also arranged to be spaced at equal intervals in the peripheral direction interposing one magnetic salient pole section of the first group mentioned above between each two adjacent permanent magnet pole sections. In other words magnetic salient pole sections of the two groups are arranged to appear alternately in the peripheral direction of the rotor core. In this instance an open angle of each of the p magnetic salient pole sections of the first group, α1, is set to be smaller than an open angle of each of the p magnetic salient pole sections of the second group, α2. Further the open angles α1 and α2 are set to satisfy the following expression.

$$\alpha 2 - \alpha 1 \approx 2\beta - (2n-1)\tau s$$

wherein n is a natural number, β is an angle defined between two salient pole section virtual center lines, CL1 and CL2. τs is a slot pitch of the stator core (denominated in rad). The outer peripheral surface sections of the permanent magnet pole sections of the rotor core may have a contour formed into an arcuate or elliptic configuration.

When the open angle α1 of the p magnetic salient pole sections of the first group and the open angle α2 of the p magnetic salient pole sections of the second group are defined as mentioned above, torque pulsation can be restrained and torque ripple can be diminished greatly as compared with the case in which the open angle of the 2p magnetic salient pole sections (each magnetic salient pole section of both first and second group) is set at equal value.

In this instance the curvature radius R1 of the magnetic pole surface of the p magnetic salient pole sections of the first group is set to be smaller than the curvature radius R2 of the magnetic pole surface of the p magnetic salient pole sections of the second group. Such arrangement permits torque ripple to be diminished as compared with the case in which the curvature radii R1 and R2 are set at the same value. In order to increase torque, on the other hand, the curvature radii R1 and R2 each are preferably set at a larger value than the curvature radii of the end portions of the magnetic pole surfaces of adjacent permanent magnet magnetic pole sections, and yet to satisfy the condition, R1<R2. However, in order to diminish torque ripple further, at the sacrifice of the torque strength, the curvature radii R1 and R2 each may, of course, be set at a smaller value than the curvature radii of the end portions of the magnetic pole surfaces of adjacent permanent magnet magnetic pole sections.

In this instance the shapes of the 2p permanent magnet magnetic pole sections and the 2p magnetic salient pole sections may preferably be determined so that the contour of the outer peripheral surface sections of the rotor core formed with two adjacent permanent magnet magnetic pole sections and a magnetic salient pole section interposed therebetween may have symmetrical shapes about the salient pole section virtual center lines (CL1, CL2) and yet so that the contour of the outer peripheral surface sections corresponding to the angle of 360°/p about the center of the shaft of the rotor each may be formed into an identical shape, thus resulting in the rotor core having p identical shapes in the outer periphery thereof. Such arrangement prevents electrical voltage unbalance or eccentric force against rotor from being generated because magnetic balance is obtained in the peripheral direction, even if open angles of magnetic salient pole sections are set at different values.

When magnetic pole surfaces of permanent magnet magnetic pole sections are formed into arcuate or elliptic shape, each of magnetic pole surfaces of permanent magnet magnetic pole sections of the rotor and each of magnetic pole surfaces of a plurality of magnetic poles of the stator core may preferably be arranged so as to have a gap defined therebetween and having a dimension δd which satisfies the following expression:

$$\delta d = \delta d0/\cos[p(\theta m - \theta dm)]$$

wherein δd0 is the minimum value of the dimension of the gap, θm is an angle defined from the virtual center line CL3 which extends in the center of the two salient pole section virtual center lines CL1 and CL2 toward the side of the magnetic salient pole section having the open angle α1. θdm is an angle between the virtual line PL3 which extends from the center of the shaft through a position where the dimension of the gap has the minimum value and the virtual center line CL3.

In the above expression, when the value of θdm is set at 0 (θdm=0°), the gap formed will constitute a general gap called "cosec gap". Such a gap configuration permits, irrespective of the direction of the rotation of the motor, a distribution of density of a magnetic flux from the permanent magnets in the gap to approach a sine wave, to thereby restrain cogging torque.

In this instance, the value of θdm which permits the value of cogging torque to be minimum is determined by the expression, θdm≈(ψ2−ψ1)/2. Angles ψ1 and ψ2 will be described in the following. However, when the distribution of density of a magnetic flux from the permanent magnets in the gap deviates greatly from the sine wave, the minimum value of the cogging torque exists within a range of $$(1/6) \times X \times \tau s \leq \theta dm \leq (1/2) \times X \times \tau s$$

wherein X is a natural number which makes θdm most approach the value of (ψ2−ψ1)/2 when the following expression is almost satisfied:

$$\theta dm \approx (\psi 2 - \psi 1)/2 \approx (1/4) \times X \times \tau s$$

In addition to satisfying the above condition, the following expressions should be satisfied also while ψ1 is an angle defined between the virtual center line CL3 and the virtual line PL1, which is one of the two virtual lines PL1 and PL2 which extend from the center of the shaft through both ends of each of the magnetic pole sections and yet the virtual line on the side of the magnetic salient pole sections having an open angle α2, and ψ2 is an angle defined between the virtual center line CL3 and the virtual line PL2, which is the other of the two virtual lines PL1 and PL2 and yet the virtual line on the side of the magnetic salient pole sections having an open angle α1:

$$\psi 2 > \psi 1$$

$$\psi 2 - \psi 1 \approx 0.5(2m-1)\tau s - (180°/p)$$

$$\psi 2 + \psi 1 \approx u \tau s$$

$$\alpha 1 + \alpha 2 \leq (360°/p) - 2(\psi 2 + \psi 1)$$

wherein m and u are arbitrary natural numbers. When such arrangement as above is satisfied, not only cogging torque can be diminished to the minimum value but also torque ripple can be restrained.

Moreover in a motor whose size of the gap δd as mentioned above does not constitute a so-called cosec gap, it is also possible to diminish cogging torque and torque ripple when the relations between the angles ψ2 and ψ1 and open angles α1 and α2 are established as mentioned above.

Furthermore when α1, α2, ψ2 and ψ1 are set at such values as to satisfy the following expressions, both cogging torque and torque ripple can be arranged to approach the minimum values.

$$(180°/2p) + (\alpha 1/2) - \psi 2 \approx (1/4)(2v1-1)\tau s$$

$$(180°/2p) + (\alpha 2/2) - \psi 1 \approx (1/4)(2v2-1)\tau s$$

wherein v1 and v2 are arbitrary natural numbers.

In order to form a first and a second non-magnetic sections with recesses at both ends in the peripheral direction of the permanent magnets of the rotor core, while the first non-magnetic section is arranged on the side of the magnetic salient pole section having an open angle α1 and the second non-magnetic section is arranged on the side of the magnetic salient pole section having an open angle α2, the shape of the non-magnetic sections may preferably be arranged in such a manner that the area of the cross section of the first and the second non-magnetic sections are the same or the area of the cross section of the second non-magnetic section is larger than the area of the cross section of the first non-magnetic section. Such arrangement permits leakage of magnetic flux from permanent magnets (short circuit of magnetic flux) to be restrained as well as demagnetization to be prevented. However, according to the present invention, the open angle α1 and the open angle α2 have different values, thus the propensity for leakage of magnetic flux from permanent magnets and propensity for demagnetization are different at both ends in the peripheral direction of the permanent magnets. Namely, in case of $\alpha1<\alpha2$, amount of leakage of the magnetic flux from permanent magnets is larger at the end in the peripheral direction on the side of the magnetic salient pole section having the open angle $\alpha2$ than at the end in the peripheral direction on the side of the magnetic salient pole section having the open angle $\alpha1$. This leads to more demagnetization of the permanent magnets at the end in the peripheral direction on the side of the magnetic salient pole section having an open angle of $\alpha2$ than at the end in the peripheral direction on the side of the magnetic salient pole section having an open angle of $\alpha1$. From the above viewpoints, the area of the cross section of the second non-magnetic section is arranged to be larger than that of the first non-magnetic section in order to positively restrain the leakage of magnetic flux from permanent magnets from the end portion on the side of the magnetic salient pole section having an open angle of $\alpha2$ and the demagnetization of the permanent magnets at the end portion thereof.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENTS

Now, an interior permanent magnet synchronous motor or a permanent magnet-equipped synchronous motor according to the present invention will be described with reference to the accompanying drawings.

Figure 1:
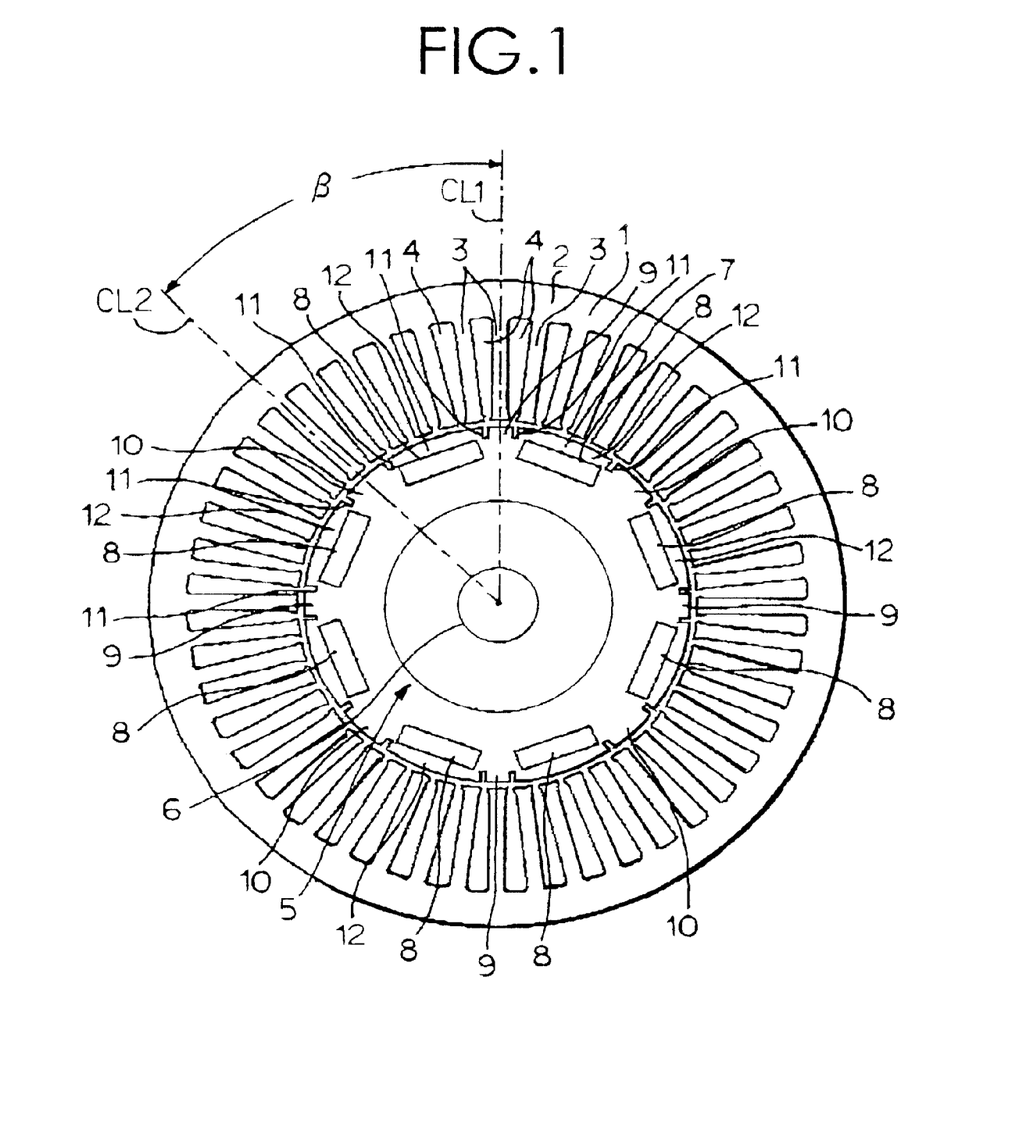
FIG. 1 is a schematic view conceptually showing a first embodiment of an interior permanent magnet synchronous motor or a permanent magnet-equipped synchronous motor according to the present invention.

Referring first to FIG. 1, a stator/rotor structure incorporated in an embodiment of a synchronous motor with built-in permanent magnets or an interior permanent magnet synchronous motor according to the present invention is illustrated. An interior permanent magnet synchronous motor of the illustrated embodiment, as shown in FIG. 1, includes a stator 1, which includes an annular yoke 2 constructed by laminating a plurality of silicon steel plates on each other. The annular yoke 2 has a plurality of teeth 3 formed on an inner periphery thereof in a manner to be spaced from each other at predetermined intervals in a peripheral direction thereof. The teeth 3 each constitute a magnetic pole section. The teeth 3 are so arranged that each of two adjacent teeth thereof have a slot 4 defined therebetween. The teeth 3 have three-phase windings wound thereon in order, resulting in forming winding sections (not shown). The yoke 2 and teeth 3 cooperate with each other to constitute a stator core.

In the illustrated embodiment, the stator 1 is so configured that the number of slots Ns is set to be forty-eight (48), the number of pole pairs is four (4), and the number of phases is three (3). Thus, "the number of slots per pole and per phase" q is determined to be q=48/(2×4×3)=2, and the slot pitch $\tau s$ is 7.5°.

The permanent magnet-equipped synchronous motor of the illustrated embodiment also includes a rotor 5. The rotor 5 includes a shaft 6, as well as a rotor core 7 fixed on the shaft 6 and having eight permanent magnets 8 incorporated therein in a manner to be spaced from each other at an interval in a peripheral direction thereof. The rotor 5 includes magnetic silent pole sections 9 and 10 defined between two adjacent permanent magnets 8. The rotor core 7 is formed, on the outer periphery thereof, with a plurality of grooves 11 which extend in both radial direction and axial direction in order to clearly form magnetic salient pole sections 9 and 10. The outer peripheral surface sections of the rotor core 7 defined outside in the radial direction corresponding to the eight permanent magnets constitute eight permanent magnet magnetic pole sections 12.

The rotor core 7 is likewise constructed by laminating silicon steel plates on each other. Also, the rotor core 7 has through-holes formed at portions thereof at which the permanent magnets 8 are incorporated in the rotor core 7, so that the permanent magnets 8 may be inserted via the through-holes into the rotor core 7. The permanent magnets in this embodiment are so configured to have a cross section of a rectangular shape respectively.

In this embodiment the shapes of eight (8) permanent magnet magnetic pole sections 12 and eight (8) magnetic salient pole sections 9 and 10 may preferably be determined so that the contour of the outer peripheral surface sections of the rotor core formed with two adjacent permanent magnet magnetic pole sections and a magnetic salient pole section interposed therebetween may have symmetrical shapes about the salient pole section virtual center lines (CL1, CL2) and yet so that the contour of each of the outer peripheral surface sections corresponding to the angle of 90° about the center of the shaft of the rotor may be formed into an identical shape, thus resulting in the rotor core having four (4) identical shapes in the outer periphery thereof.

The eight magnetic salient pole sections comprise two groups (a first and a second groups) of magnetic salient pole sections. Each of the four magnetic salient pole sections 9 of the first group is arranged to be spaced at equal intervals in the peripheral direction interposing one magnetic salient pole section of a second group between each two adjacent magnetic salient pole sections 9. Similarly, each of the four magnetic salient pole sections 10 of the second group is also arranged to be spaced at equal intervals in the peripheral direction interposing one magnetic salient pole section of the first group mentioned above between each two adjacent magnetic salient pole sections 10. The open angle $\alpha 1$ of the four (4) magnetic salient pole sections 9 of the first group is smaller than the open angle $\alpha 2$ of the four magnetic salient pole sections 10 of the second group. In this embodiment the slot pitch of the stator core is 7.5° and the slot opening is 2.1°, therefore the open angle $\alpha 2$ is 15° and the open angle $\alpha 1$ is 7.5°. In this instance the preferable range of the open angle $\alpha 2$ is $12.9° \leq \alpha 2 \leq 17.1°$ and the preferable range of the open angle $\alpha 1$ is $5.4° \leq \alpha 2 \leq 9.6°$.

The relation between the open angles $\alpha 1$ and $\alpha 2$ is represented in a general expression as follows and the values of $\alpha 1$ and $\alpha 2$ are determined to satisfy the expression.

$$\alpha 2 - \alpha 1 \approx (2\beta) - (2n-1)\tau s \qquad (1)$$

wherein n is a natural number and $\beta$ is an angle between the two virtual center lines (CL1, CL2) extending from the center of the shaft through the center of two adjacent magnetic salient pole sections. $\tau s$ is the slot pitch of the above mentioned stator core. In this embodiment n is six (n=6). When the above expression is satisfied, the torque ripple can be greatly reduced as compared with conventional synchronous motors.

Figure 2:
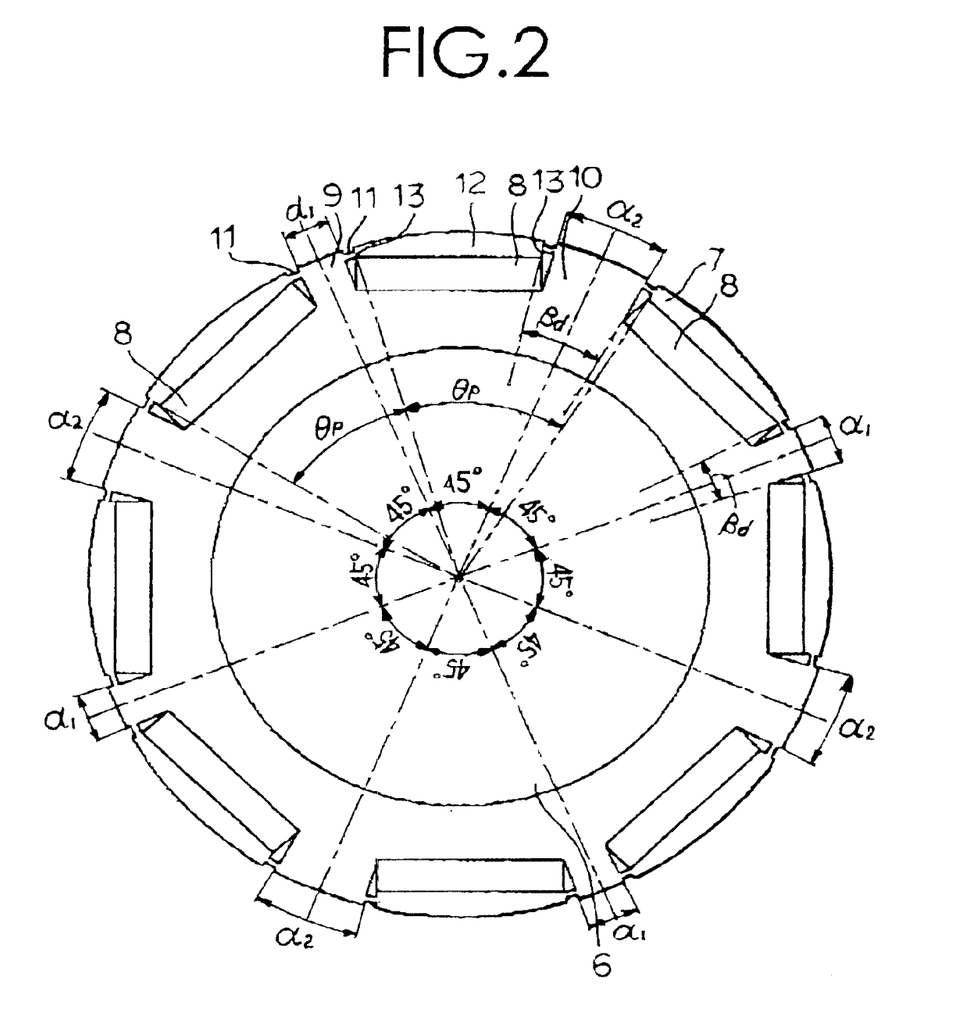
FIG. 2 is a schematic view conceptually showing a rotor incorporated in a second embodiment of an interior permanent magnet synchronous motor or a permanent magnet-equipped synchronous motor according to the present invention.

FIG. 2 shows the structure of a rotor incorporated in a second embodiment of the interior permanent magnet synchronous motor according to the present invention. This embodiment differs from the first embodiment on the point that the rotor core is provided with a pair of non-magnetic sections 13 at both sides in the peripheral direction of each of the permanent magnets 8. The open angles $\alpha 1$ and $\alpha 2$ of the respective four magnetic salient pole sections 9 and 10 are determined similarly as in the case of the embodiment shown in FIG. 1.

The open angle of the grooves 11 can be obtained as the angle ($\beta d - \alpha 1$). In this instance the open angle of the grooves 11 is 1.875°. The angle $\beta d$ is determined in the following expression:

$$\beta d \approx (1/2)(2n-1)\tau s$$

wherein n is a natural number.

Figure 3:
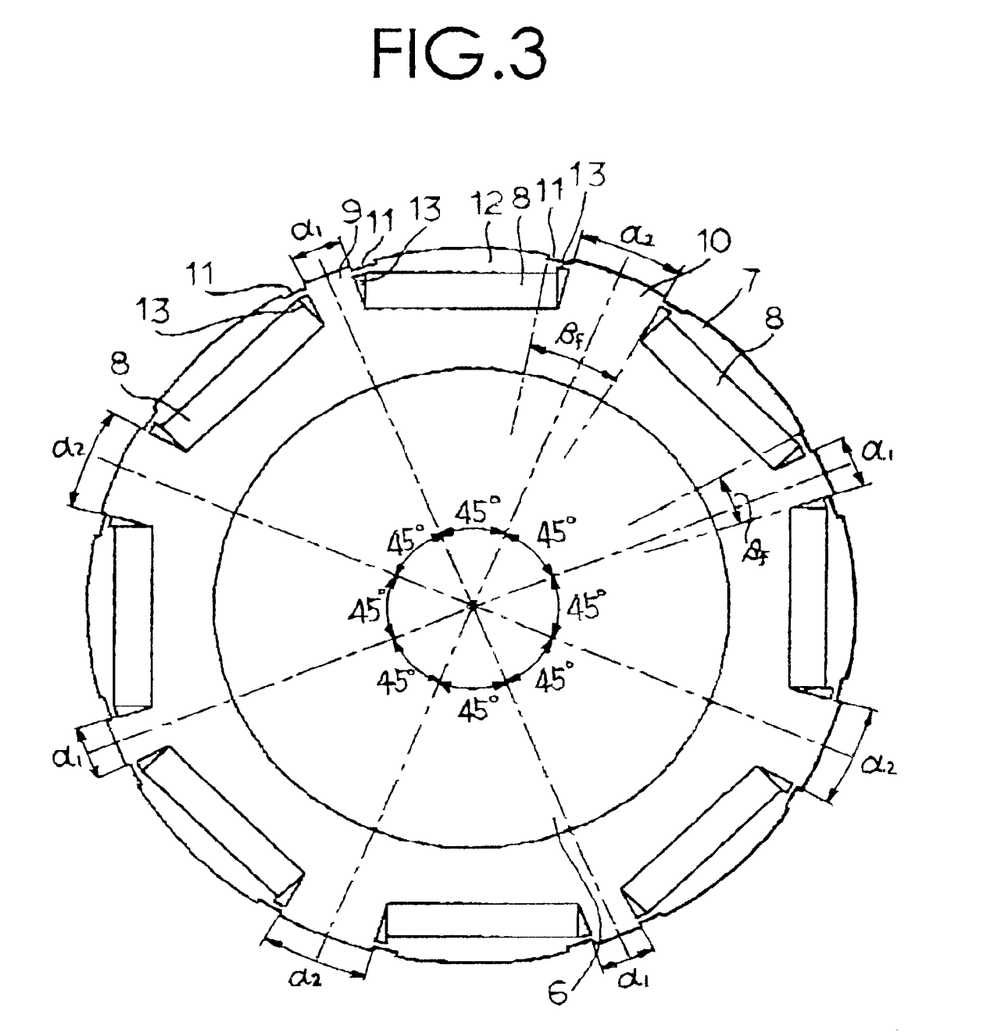
FIG. 3 is a schematic view conceptually showing a rotor incorporated in a third embodiment of an interior permanent magnet synchronous motor or a permanent magnet-equipped synchronous motor according to the present invention.

FIG. 3 shows the structure of a rotor incorporated in a third embodiment of the interior permanent magnet synchronous motor according to the present invention particularly described in claim 9. This embodiment differs from the second embodiment on the point that the open angle of the grooves 11 (the dimension of the width of the grooves in the peripheral direction) is larger than the open angle of the grooves 11 in the second embodiment, and the dimension of the length of the permanent magnets 12 in the peripheral direction is shorter than the length of the permanent magnets 12 in the second embodiment. The structure of the rest of the rotor is the same as that of the rotor in the second embodiment. In this embodiment the open angle of the grooves 11 ($\beta f - \alpha 1$) is set at 3.75°. $\beta f$ is determined in the expression, $\beta f \approx (1/4)(2n-1)\tau s$, wherein n is a natural number also.

Figure 4:
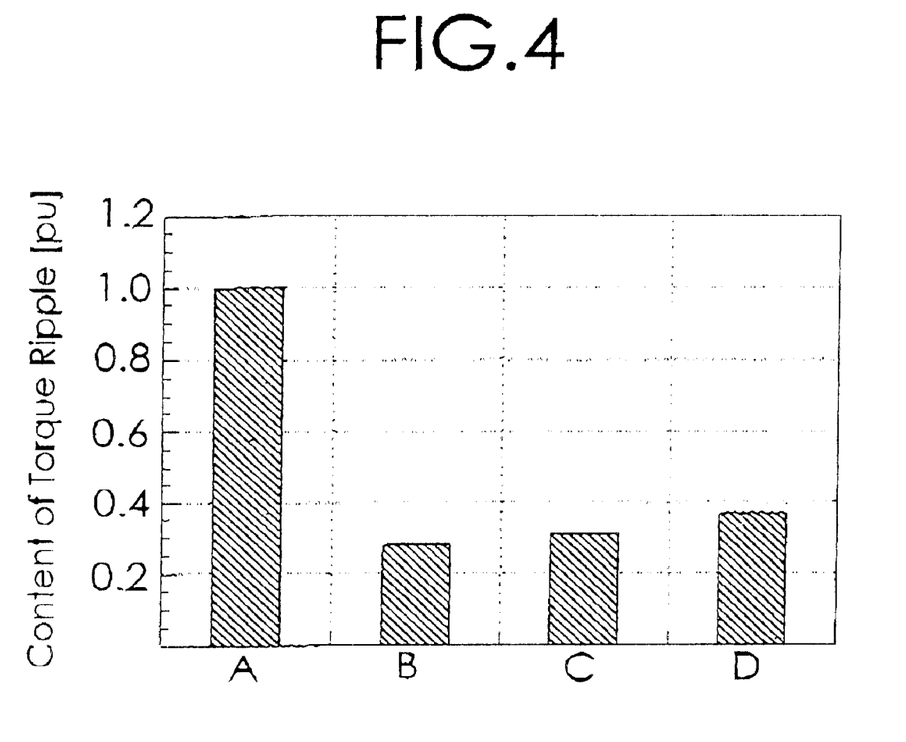
FIG. 4 is a graphical representation showing torque ripple in the embodiments shown in the FIGS. 1–3.

FIG. 4 shows data of the content of torque ripple in the embodiments shown in FIGS. 1–3. In the FIG. 4, "A" indicates the value of torque ripple of a conventional interior permanent magnet synchronous motor, wherein each of the open angle of eight magnetic salient pole potions is set at the same value (8.75°). "B", "C" and "D" indicate the content of torque ripple of the interior permanent magnet synchronous motors shown in FIGS. 1–3. It is understood in FIG. 4 that with the embodiments of the interior permanent magnet synchronous motor according to the present invention, torque ripple can be reduced greatly.

Figure 5:
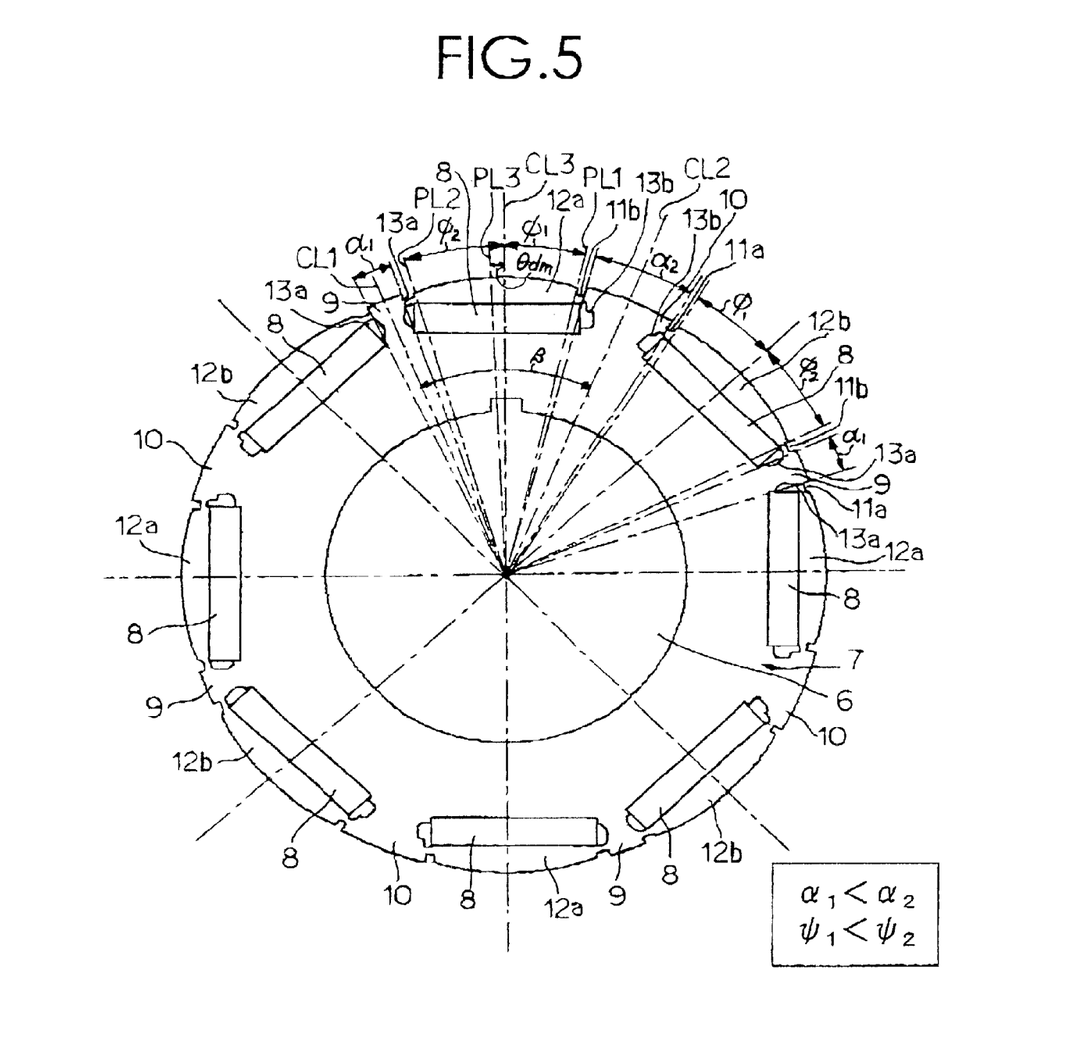
FIG. 5 is a schematic view conceptually showing a fourth embodiment of an interior permanent magnet synchronous motor or a permanent magnet-equipped synchronous motor according to the present invention.

FIG. 5 shows the structure of a rotor incorporated in a fourth embodiment of the interior permanent magnet synchronous motor according to the present invention. The structure of the stator core is the same as in the first embodiment of the interior permanent magnet synchronous motor. In FIG. 5, the same reference numerals as in FIG. 1 are used for the similar parts as shown in FIG. 1. In this embodiment eight (2p) permanent magnets 12a, 12b consist of two groups (a first and a second groups) of permanent magnets, a first group of which consists of four (p) permanent magnets 12a arranged so as to be spaced at equal intervals in the peripheral direction while having one permanent magnet of a second group interposed between each of two adjacent permanent magnets 12a and a second group of which consists of four (p) permanent magnets 12b arranged so as to be spaced at equal intervals in the peripheral direction while having one permanent magnet of the first group interposed between each of two adjacent permanent magnets 12b. Also eight (2p) magnetic salient pole sections 9, 10 consists of two groups (a first and a second groups) of magnetic salient pole sections, a first group of which consists of four (p) magnetic salient pole sections 9 arranged so as to be spaced at equal intervals in the peripheral direction while having one magnetic salient pole section of a second group interposed between each of two adjacent magnetic salient pole sections 9 and a second group of which consists of four (p) magnetic salient pole sections 10 arranged so as to be spaced at equal intervals in the peripheral direction while having one magnetic salient pole section of the first group interposed between each of two adjacent magnetic salient pole sections 10. In this instance the open angle $\alpha 1$ of the four magnetic salient pole sections 9 of the first group is smaller than the open angle $\alpha 2$ of the four magnetic salient pole sections 10 of the second group. In this embodiment also, the open angles $\alpha 1$ and $\alpha 2$ are set to satisfy the above expression (1).

More specifically, the slot pitch of the stator core is 7.5°; the slot opening is 2.1°. Then the open angle $\alpha 2$ may preferably be set within the range of $12.9° \leq \alpha 2 \leq 17.1°$ and the open angles $\alpha 1$ may preferably set in the range of $5.4° \leq \alpha 1 \leq 9.6°$. In this instance $\alpha 2$ and $\alpha 1$ are set at 16° and 6.5° respectively.

In this instance the shapes of eight (8) permanent magnet magnetic pole sections 12a, 12b and eight (8) magnetic salient pole sections 9, 10 may preferably be determined so that the contour of the outer peripheral surface sections of the rotor core 7 formed with two adjacent permanent magnet magnetic pole sections 12a, 12b and a magnetic salient pole section interposed therebetween 9 or 10 is configured so as to have symmetrical shapes about the salient pole section virtual center lines CL1 or CL2 and yet so that the contour of the outer peripheral surface sections corresponding to the angle of 90°(360°/p) about the center of the shaft of the rotor each may be formed into an identical shape, thus resulting in the rotor core having four (p) identical shapes in the outer periphery thereof. Such arrangement prevents electrical voltage unbalance at each phase or eccentric force against rotor from being generated because magnetic balance is obtained in the peripheral direction, even if open angles $\alpha 1$ and α2 of magnetic salient pole sections 9, 10 are set at different values.

In this instance each of magnetic pole surfaces of permanent magnet magnetic pole sections 12a, 12b of the rotor core and each of magnetic pole surfaces of a plurality of magnetic poles of the stator core are arranged so as to have a gap defined therebetween and having a size or dimension (d which satisfies the following expression to constitute a so-called "cosec gap":

$$\delta d = \delta d0 / \cos[p(\theta m - \theta dm)] \quad (2)$$

wherein $\delta d0$ is the minimum value of the dimension of the gap, $\theta m$ is an angle defined from the virtual center line CL3 which extends in the center of the two salient pole section virtual center lines CL1 and CL2 toward the side of the magnetic salient pole section having an open angle α1. $\theta dm$ is an angle between the virtual center line CL3 and the virtual line PL3 which extends from the center of the shaft through a position where the dimension of the gap has the minimum value.

In this instance, the value of $\theta dm$ which permits the value of cogging torque to be the minimum is determined by the expression, $\theta dm \approx (\psi 2 - \psi 1)/2$. Angles $\psi 1$ and $\psi 2$ will be described in the following. However, when the distribution of density of a magnetic flux from the permanent magnets in the gap deviates greatly from the sine wave, the minimum value of the cogging torque exists within a range of $$(1/6) \times X \times \tau s \leq \theta dm \leq (1/2) \times X \times \tau s$$

wherein X is a natural number which makes $\theta dm$ most approach the value of $(\psi 2 - \psi 1)/2$ when the following expression is satisfied:

$$\theta dm \approx (\psi 2 - \psi 1)2 \approx (1/4) \times X \times \tau s$$

The shapes of the permanent magnet magnetic pole sections 12a and 12b are formed into arcuate or elliptic configuration so as to make the dimension of the gap $\delta d$ approach the value determined in the above expression.

Figure 6:
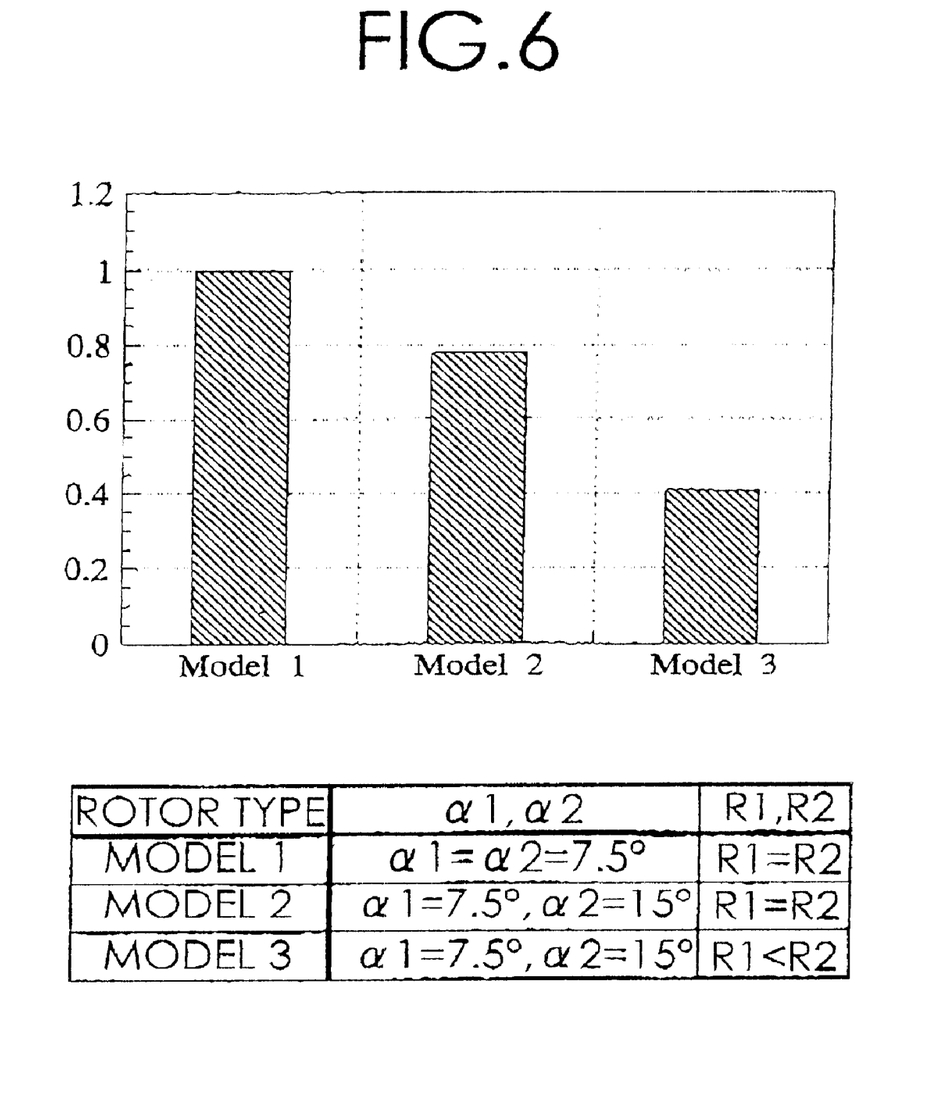
FIG. 6 is a graphical representation showing decrease of torque ripple wherein R1 and R2 are varied.

In this instance the curvature radius R1 of the magnetic salient pole sections 9 having an open angle α1 is set to be smaller than curvature radius R2 of the magnetic salient pole section 10 having an open angle α2. When curvature radius R1 of the magnetic pole surface of the p magnetic salient pole sections of the first group is set smaller than curvature radius R2 of the magnetic pole surface of the p magnetic salient pole sections of the second group, the torque ripple can be reduced as compared with the case wherein curvature radius R1 and R2 are set at the same value. In order to increase torque, on the other hand, curvature radii R1 and R2 may preferably be set larger than curvature radii of the end portions of adjacent permanent magnet magnetic pole sections and yet set at such values as to satisfy the condition R1<R2. FIG. 6 shows the results of the content of torque measured in the conditions of models 1–3 which were arranged in order to recognize the effects of different conditions on torque. As shown in FIG. 6, the value of torque ripple marked the smallest value in the case of Model 3 wherein the condition R1<R2 was satisfied.

In the above expression, when the value of $\theta dm$ is set at 0 ($\theta dm=0°$), the gap formed will constitute a general gap called "cosec gap". Such a gap configuration permits, irrespective of the direction of the rotation of the motor, a distribution of density of a magnetic flux from the permanent magnets in the gap to approach a sine wave, to thereby restrain cogging torque. Moreover, when the value of the slot pitch, $\theta dm$, is set within the range between (1/6) slot pitch and (1/2) slot pitch, cogging torque can be reduced greatly while keeping the distribution of density of a magnetic flux from the permanent magnets in the gap in a state of the sine wave. In the embodiment shown in FIG. 5, $\theta m$ is set at 2°.

In addition to satisfying the above condition, the following expressions are satisfied in this embodiment also, while $\psi 1$ is an angle defined between the virtual center line CL3 and the virtual line PL1 which is one of the two virtual lines PL1 and PL2 which extend from the center of the shaft through both ends of each of the magnetic pole sections 12a, 12b and yet the virtual line on the side of the magnetic salient pole section 10 having an open angle α2, and $\psi 2$ is an angle defined between the virtual center line CL3 and the virtual line PL2 which is the other of the two virtual lines PL1 and PL2 which extend from the center of the shaft through both ends of each of the magnetic pole sections and yet the virtual line on the side of the magnetic salient pole section 9 having an open angle α1:

$$\psi 2 > \psi 1 \quad (3)$$

$$\psi 2 - \psi 1 \approx 0.5(2m-1)\tau s - (180°/p) \quad (4)$$

$$\psi 2 + \psi 1 \approx u \cdot \tau s \quad (5)$$

$$\alpha 1 + \alpha 2 \leq (360°/p) - 2(\psi 2 + \psi 1) \quad (6)$$

wherein p is the number of pole pairs and m and u are arbitrary natural numbers. When such arrangement as shown in the above expressions are satisfied, cogging torque can be diminished to the minimum value. More particularly in this instance the angle $\psi 1$ may preferably be set within the range of $11.025° \leq \psi 1 \leq 15.225°$. The angle $\psi 2$ may preferably be set within the range of $14.775° \leq \psi 2 \leq 18.975°$. At the same time the angles $\psi 1$ and $\psi 2$ are preferably determined so as to satisfy the following conditions:

$$1.65° \leq \psi 2 - \psi 1 \leq 5.85° \text{ and}$$

$$27.9° \leq \psi 2 + \psi 1 \leq 32.1°$$

In this embodiment the angle $\psi 1$ is set at 13.125° and $\psi 2$ is set at 16.875°. These values of these angles are obtained, when the following values are put in the above expressions (4) and (5) $\tau s=7.5$ p=4 m=7 u=4

$$\psi 2 - \psi 1 \approx 0.5(2m-1)\tau s - (180°/p) \quad (4)$$

$$\psi 2 + \psi 1 \approx u \cdot \tau s \quad (5)$$

$$\psi 2 - \psi 1 = 0.5(2m-1)\tau s - (180°/p) = 0.5 \times (2 \times 7 - 1) \times 7.5 - (180 \cdot 4) = 3.75°$$

$$\psi 2 + \psi 1 \approx u \cdot \tau s = 4 \times 7.5 = 30°$$

By solving the above two expressions, $\psi 1$ and $\psi 2$ are determined as 13.125° and 16.875° respectively.

Based on the values of the above angles $\psi 1$ and $\psi 2$, the optimal values of the $\theta dm$ and $\theta m$ to make the value of cogging torque the minimum are obtained in the expressions:

$$\theta dm = (\psi 2 - \psi 1)/2 = (16.875 - 13.125)/2 = 1.875°$$

Therefore when $\theta dm$ is 1.875 ($\theta dm=1.875$), the value of cogging torque becomes the minimum. Then X in the expression $\theta dm \approx (\psi 2 - \psi 1)/2 \approx (1/4) \times X \times \tau s$ is obtained. The value of X to satisfy $(1/4) \times X \times \tau s = 1.875$ is 1.

Now by substituting 1 for X (X=1) and 7.5 for $\tau s$ ($\tau s=7.5$) in the above mentioned expression $(1/6) \times X \times \tau s \leq \theta dm \leq (1/2) \times X \times \tau s$, the optimum range of $\theta dm$ is determined as $1.25° \leq \theta dm \leq 3.75°$.

Figure 7:
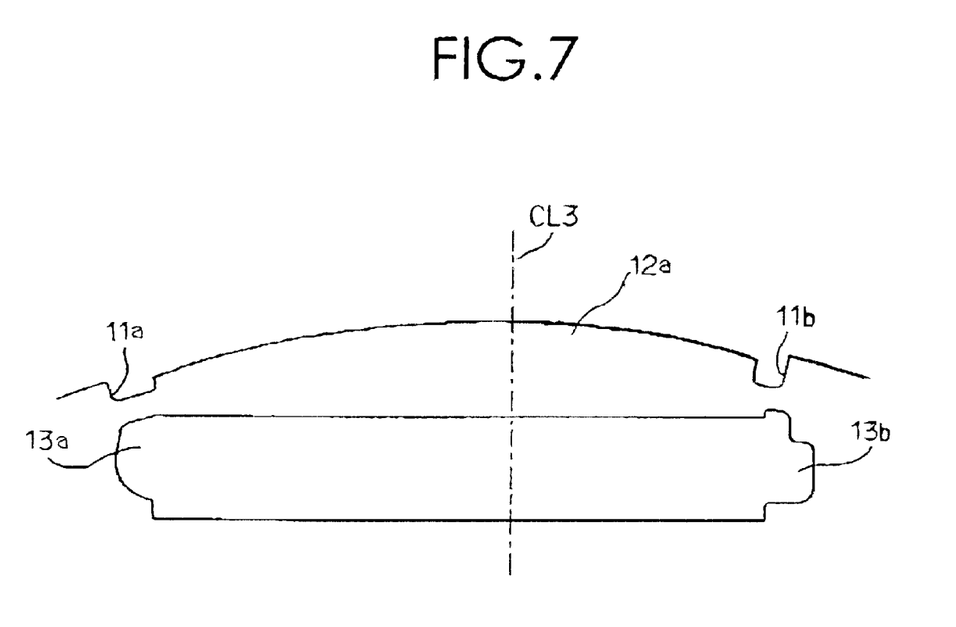
FIG. 7 is an enlarged schematic view of FIG. 5.

As shown in FIG. 7, the width in the peripheral direction of the grooves 11*a* and 11*b* (open angles) are set at 2.25° and 1.5° respectively. Also as shown in FIG. 7 a first and a second non-magnetic sections 13*a*, 13*b* formed on the rotor core 7 are configured in different shapes.

In this embodiment the value of torque ripple can be made the minimum, when α1, α2, ψ1 and ψ2 are determined to satisfy the following expressions (7) and (8).

$$(180°/2P)+(\alpha 1/2)-\psi 2=(1/4)(2v1-1)\tau s \tag{7}$$

$$(180°/2P)+(\alpha 2/2)-\psi 1=(1/4)(2v2-1)\tau s \tag{8}$$

wherein v1 and v2 are arbitrary natural numbers

In this instance, the angles at different portions are set to satisfy the above expressions of (7) and (8).

Figure 8:
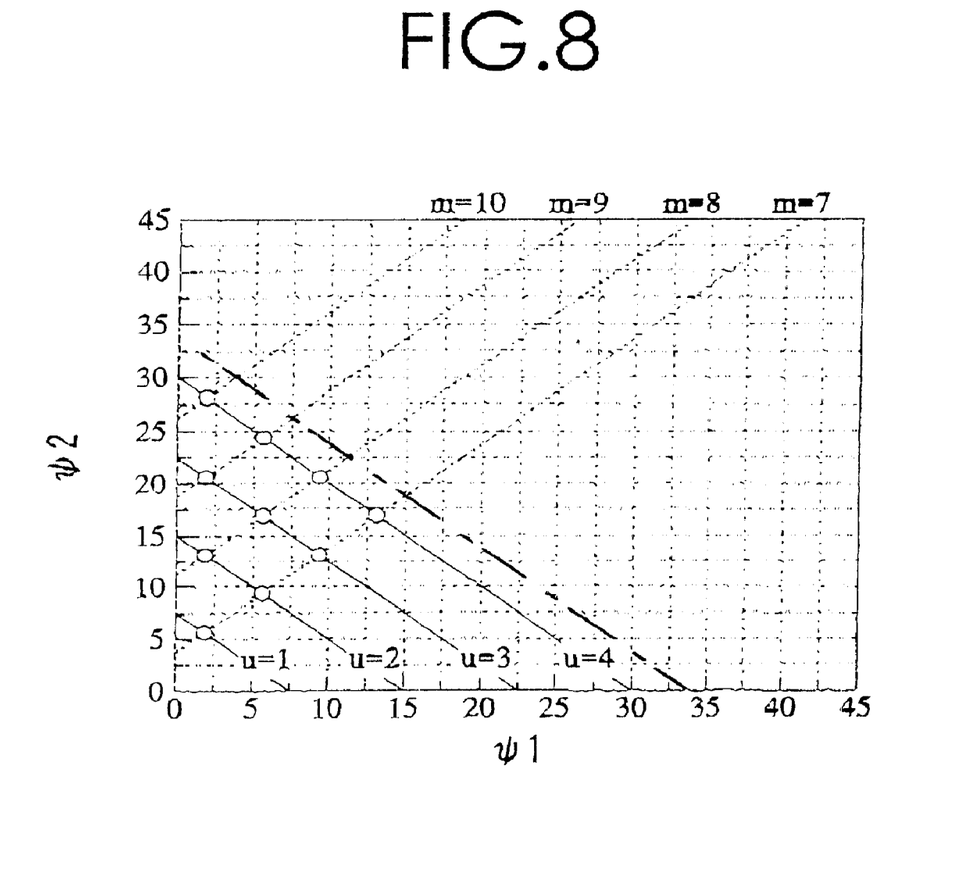
FIG. 8 is a graphical representation showing relationship between $\psi2$ and $\psi1$ which makes the value of cogging torque the minimum in a synchronous motor with eight pole pairs (P=8), 48 slots and distributed windings.

The conditions for the angles at different portions to make the torque ripple the minimum are obtained by solving the simultaneous equations of (3), (4), (5) and (6). FIG. 8 shows the relationship between ψ2, ψ1 and m which make the value of cogging torque the minimum in a synchronous motor with eight pole pairs (P=8), 48 slots and distributed windings. The values along the axis of ordinates show the values of ψ2 and the values along the axis of abscissas show the values of ψ1. In FIG. 8, the points shown by small circles are the values which make the torque ripple the minimum when substituting the determined values of m and u.

Figure 9:
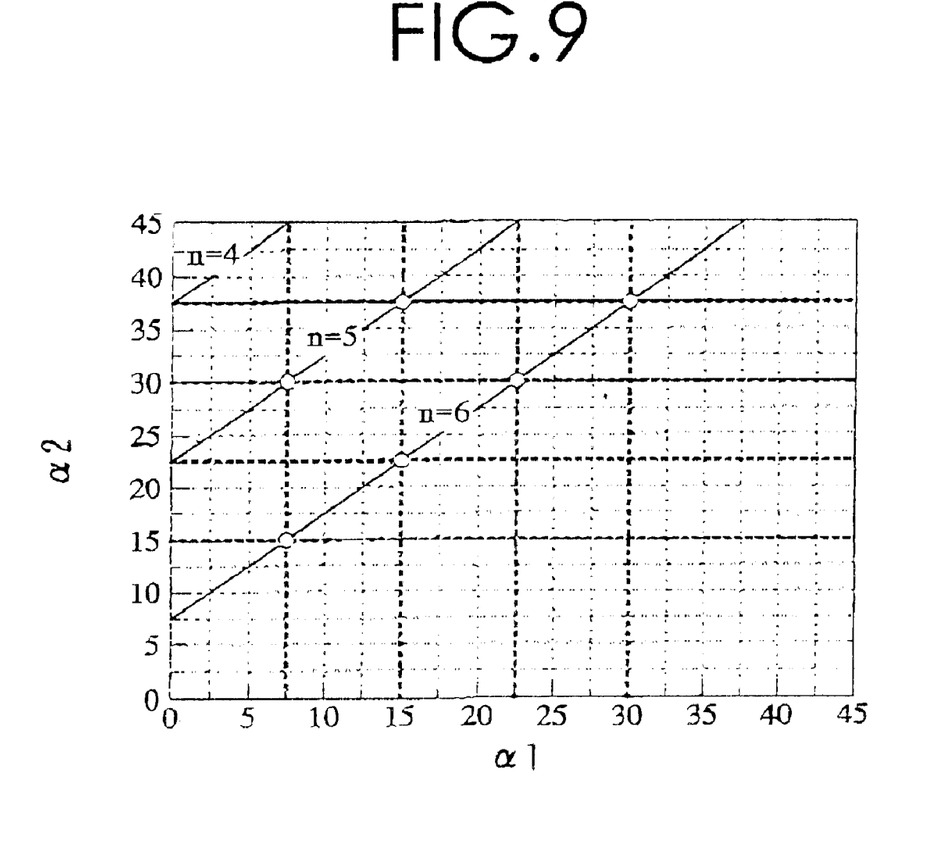
FIG. 9 is a graphical representation showing relationship between $\alpha1$ and $\alpha2$ which makes the value of torque ripple obtained by the expressions (1), (8) and (9) the minimum.

FIG. 9 shows the relationship between α1, α2 and n which are obtained by solving the above expressions (7) and (8). In the embodiments of the present invention, when the values of α1 and α2 are determined to satisfy the relationship shown in FIG. 9, the torque ripple can be reduced to the minimum.

According to the present invention cogging torque and torque pulsation can be restrained in an interior permanent magnet synchronous motor.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An interior permanent magnet synchronous motor comprising:

a stator including a stator core provided with a plurality of magnetic pole sections having windings of at least one phase wound thereon;

a rotor having p pole pairs (p: a positive integer of 1 or more);

said rotor including a shaft and a rotor core fixed on said shaft;

said rotor core having 2p permanent magnets incorporated therein in a manner to be spaced from each other at intervals in a peripheral direction thereof;

said 2p permanent magnets constituting 2p permanent magnet magnetic pole sections formed on an outer periphery of said rotor core;

said rotor being formed with 2p magnetic salient pole sections so as to interpose said permanent magnet magnetic pole section therebetween;

said 2p magnetic salient pole sections consisting of a first and a second groups of magnetic salient pole sections, said first group consisting of p magnetic salient pole sections arranged so as to be spaced at equal intervals in the peripheral direction while each of the magnetic salient pole sections of a second group is interposed between two adjacent magnetic salient pole sections and said second group consisting of p magnetic salient pole sections arranged so as to be spaced at equal intervals in the peripheral direction while each of magnetic salient pole sections of the first group is interposed between two adjacent magnetic salient pole sections;

wherein an open angle α1 of said p magnetic salient pole sections of said first group is set smaller than an open angle α2 of said p magnetic salient pole sections of said second group;

said open angles α1 and α2 are determined to satisfy the following expressions:

$$\alpha 2-\alpha 1=2\beta-(2n-1)\tau s$$

wherein n is a natural number, β is an angle between two salient pole section virtual center lines CL1, CL2 which extend from the center of said shaft through the center of said two adjacent magnetic salient pole sections, and τs is the slot pitch of said stator core.

2. An interior permanent magnet synchronous motor as defined in claim 1, wherein curvature radius R1 of said p magnetic salient pole sections of the first group is smaller than curvature radius R2 of said p magnetic salient pole sections of the second group.

3. The interior permanent magnet synchronous motor as defined in claim 2, wherein said rotor core has a first and a second non-magnetic sections at both ends in the peripheral direction of the magnets, the first and second non-magnetic sections being formed of recesses;

said first non-magnetic section being arranged on the side of the magnetic salient pole section having the open angle α1 and said second non-magnetic section being arranged on the side of the magnetic salient pole section having the open angle 2;

wherein the shape of said first and second non-magnetic sections are determined such that an area of the cross section of the second non-magnetic section is equal to or larger than an area of the cross section of said first non-magnetic section.

4. An interior permanent magnet synchronous motor as defined in claim 2, wherein each of the magnetic pole surfaces of said permanent magnet magnetic pole sections is formed into arcuate or elliptic configuration;

wherein each of said magnetic pole surfaces of said permanent magnet magnetic pole sections of rotor core and each of magnetic pole surfaces of said magnetic pole sections of said stator core are arranged so as to have a gap defined therebetween and having a dimension δd which satisfies or almost satisfies the following expression:

$$\delta d=\delta d0/\cos[p(\theta m-\theta dm)]$$

wherein δd0 is the minimum value of the dimension of said gap, θm is an angle defined from a virtual center line CL3 which extends from the center of the shaft through a center of the two salient pole section virtual center lines CL1, CL2 toward the side of the magnetic salient pole section having the open angle α1, and θdm is an angle between the virtual line PL3 which extends from the center of the shaft and through a position where the dimension of the gap has the minimum value and the virtual center line CL3.

5. The interior permanent magnet synchronous motor as defined in claim 4, wherein said rotor core has a first and a second non-magnetic sections at both ends in the peripheral direction of the magnets, the first and second non-magnetic sections being formed of recesses;

said first non-magnetic section being arranged on the side of the magnetic salient pole section having the open angle α1 and said second non-magnetic section being arranged on the side of the magnetic salient pole section having the open angle α2;

wherein the shape of said first and second non-magnetic sections are determined such that an area of the cross section of the second non-magnetic section is equal to or larger than an area of the cross section of said first non-magnetic section.

6. An interior permanent magnet synchronous motor as defined in claim 4, wherein the following expressions are satisfied while φ1 is an angle defined between the virtual center line CL3 and a virtual line PL1 which is one of the two virtual lines PL1 and PL2 which extend from the center of the shaft through both ends of each of the magnetic pole sections, the virtual line PL1 being positioned on the side of the magnetic salient pole section having the open angle α2, and φ2 is an angle defined between the virtual center line CL3 and the virtual line PL2 which is the other of the two virtual lines PL1 and PL2 and which is positioned on the side of the magnetic salient pole section having the open angle α1:

$$\phi 2 > \phi 1$$

$$\phi 2 - \phi 1 = 0.5(2m-1)\tau s - (180°/p)$$

$$\phi 2 + \phi 1 = u\tau s$$

$$\alpha 1 + \alpha 2 \leq (360°/p) - 2(\phi 2 + \phi 1)$$

wherein p is the number of pole pairs and m and u are arbitrary natural numbers.

7. The interior permanent magnet synchronous motor as defined in claim 6, wherein said rotor core has a first and a second non-magnetic sections at both ends in the peripheral direction of the magnets, the first and second non-magnetic sections being formed of recesses;

said first non-magnetic section being arranged on the side of the magnetic salient pole section having the open angle α1 and said second non-magnetic section being arranged on the side of the magnetic salient pole section having the open angle α2;

wherein the shape of said first and second non-magnetic sections are determined such that an area of the cross section of the second non-magnetic section is equal to or larger than an area of the cross section of said first non-magnetic section.

8. An interior permanent magnet synchronous motor as defined in claim 5, wherein said α1, α2, φ1 and φ2 are set at such values as to satisfy the following expressions also:

$$(180°/2p)+(\alpha 1/2)-\phi 2=(1/4)(2v1-1)\tau s$$

$$(180°/2p)+(\alpha 2/2)-\phi 1=(1/4)(2v2-1)\tau s$$

wherein v1 and v2 are arbitrary natural numbers.

9. The interior permanent magnet synchronous motor as defined in claim 8, wherein said rotor core has a first and a second non-magnetic sections at both ends in the peripheral direction of the magnets, the first and second non-magnetic sections being formed of recesses;

said first non-magnetic section being arranged on the side of the magnetic salient pole section having the open angle α1 and said second non-magnetic section being arranged on the side of the magnetic salient pole section having the open angle α2;

wherein the shape of said first and second non-magnetic sections are determined such that an area of the cross section of the second non-magnetic section is equal to or larger than an area of the cross section of said first non-magnetic section.

10. The interior permanent magnet synchronous motor as defined in claim 1, wherein said rotor core has a first and a second non-magnetic sections at both ends in the peripheral direction of the magnets, the first and second non-magnetic sections being formed of recesses;

said first non-magnetic section being arranged on the side of the magnetic salient pole section having the open angle α1 and said second non-magnetic section being arranged on the side of the magnetic salient pole section having the open angle α2;

wherein the shape of said first and second non-magnetic sections are determined such that an area of the cross section of the second non-magnetic section is equal to or larger than an area of the cross section of said first non-magnetic section.

11. An interior permanent magnet synchronous motor as defined in claim 1, wherein the shapes of said 2p permanent magnet magnetic pole sections and said 2p magnetic salient pole sections are determined so that the contour of an outer peripheral surface section of the rotor core formed with said two adjacent permanent magnetic pole sections and said magnetic salient pole section interposed therebetween is configured so as to have symmetrical shapes about the salient pole section virtual center lines CL1 or CL2 and so that the contour of the outer peripheral surface sections corresponding to the angle of 360°/p about the center of the shaft of the rotor each may be formed into an identical shape, thus resulting in the rotor core having p identical shapes in the outer periphery thereof.

12. The interior permanent magnet synchronous motor as defined in claim 11, wherein said rotor core has a first and a second non-magnetic sections at both ends in the peripheral direction of the magnets, the first and second non-magnetic sections being formed of recesses;

said first non-magnetic section being arranged on the side of the magnetic salient pole section having the open angle α1 and said second non-magnetic section being arranged on the side of the magnetic salient pole section having the open angle α2;

wherein the shape of said first and second non-magnetic sections are determined such that an area of the cross section of the second non-magnetic section is equal to or larger than an area of the cross section of said first non-magnetic section.

13. An interior permanent magnet synchronous motor comprising:

a stator including a stator core provided with a plurality of magnetic pole sections having windings of three phases wound thereon;

a rotor having four pole pairs said rotor including a shaft and a rotor core fixed on said shaft;

said rotor core having eight permanent magnets incorporated therein in a manner to be spaced from each other at intervals in a peripheral direction thereof;

said eight permanent magnets each constituting eight permanent magnet magnetic pole sections formed on an outer periphery of said rotor core;

said rotor being formed with eight magnetic silent pole sections so as to interpose said permanent magnet magnetic pole section therebetween;

said eight permanent magnet magnetic pole sections consisting of a first and a second groups of permanent magnet magnetic pole sections;

said first group consisting of four permanent magnet magnetic pole sections arranged to be spaced at equal intervals in the peripheral direction interposing one permanent magnet magnetic pole section of said second group between each adjacent two permanent magnet magnetic pole sections of the first group;

said second group consisting of four permanent magnet magnetic pole sections arranged to be spaced at equal intervals in the peripheral direction interposing one permanent magnet magnetic pole section of said first group between each adjacent two permanent magnet magnetic pole sections of the second group;

said eight magnetic salient pole sections consisting of a first and a second groups of the magnetic salient pole sections;

said first group of magnetic salient pole sections consisting of four magnetic salient pole sections arranged to be spaced at equal intervals in the peripheral direction interposing one magnetic salient pole section of said second group between each adjacent two magnetic salient pole sections of said first group;

said second group of magnetic salient pole sections consisting of four magnetic salient pole sections arranged to be spaced at equal intervals in the peripheral direction interposing one magnetic salient pole section of said first group between each adjacent two magnetic salient pole sections of said second group;

wherein the open angle $\alpha 1$ of the four magnetic salient pole sections of said first group is smaller than the open angle $\alpha 2$ of the four magnetic salient pole sections of said second group;

wherein said open angle $\alpha 2$ is determined within the range of $12.9° \leq \alpha 2 \leq 17.1°$ and said open angle $\alpha 1$ is determined within the range of $5.4° \leq \alpha 1 \leq 9.6°$, when the slot pitch of said stator core is $7.5°$ and the slot opening is $2.1°$.

14. An interior permanent magnet synchronous motor as defined in claim 13, wherein the shapes of said eight permanent magnet magnetic pole sections and said eight magnetic salient pole sections are determined so that the contour of an outer peripheral surface section of the rotor core formed with two said adjacent permanent magnetic pole sections and said magnetic salient pole section interposed therebetween is configured so as to have symmetrical shapes about the salient pole section virtual center line of CL1 or CL2 and yet so that the contour of the outer peripheral surface sections of said rotor core corresponding to the angle of 90° about the center of the shaft of the rotor each may be formed into an identical shape, thus resulting in the rotor core having four identical shapes in the outer periphery thereof.

15. An interior permanent magnet synchronous motor as defined in claim 14, wherein $\psi 1$ is an angle defined between the virtual center line CL3 and a virtual line PL1, which is one of the two virtual lines PL1 and PL2 which extend from the center of the shaft through both ends of each of the magnetic pole sections, the virtual line PL1 being positioned on the side of the magnetic salient pole section having an open angle $\alpha 2$, and $\psi 1$ is set within the range of $11.025° \leq \psi 1 \leq 15.225°$, and $\psi 2$ is an angle defined between the virtual center line CL3 and the virtual line PL2, which is the other of the two virtual lines PL1 and PL2, the virtual line PL2 being positioned on the side of the magnetic salient pole section having an open angle $\alpha 1$, and $\psi 2$ is set within the range of $14.775° \leq \psi 2 \leq 18.975°$ said open angles $\psi 1$ and $\psi 2$ are determined to satisfy the following expression:

$1.65° \leq \psi 2 - \psi 1 \leq 5.85°$ and $27.9° \leq 2 + \psi 1 \leq 32.1°$.

16. An interior permanent magnet synchronous motor as defined in claim 10, wherein magnetic pole surface of said permanent magnet magnetic pole sections are formed into arcuate or elliptic shape, each of said magnetic pole surfaces of said permanent magnet magnetic pole sections of rotor core and each of magnetic pole surfaces of said magnetic pole sections of said stator core being arranged so as to have a gap defined therebetween and having a dimension $\delta d$ which satisfies the following expression:

$$\delta d = \delta d0 / \cos[p(\theta m - \theta dm)] \quad (2)$$

wherein $\theta d0$ is the minimum value of the dimension of the gap, $\theta m$ is an angle defined from a virtual center line CL3 which extends from the center of the shaft through a center of the two salient pole section virtual center lines CL1 and CL2 toward the side of the magnetic salient pole section having an open angle $\alpha 1$;

wherein $\theta dm$ is an angle within the range of $1.25° \leq \theta dm \leq 3.75°$.

* * * * *

UNITED STATES PATENT AND TRADEMARK OFFICE
CERTIFICATE OF CORRECTION

PATENT NO.     : 6,597,079 B2
DATED          : July 22, 2003
INVENTOR(S)    : Miyashita et al.

It is certified that error appears in the above-identified patent and that said Letters Patent is hereby corrected as shown below:

Column 1,
Line 57, delete "which" and insert -- that --.

Column 7,
Lines 52-53, delete "particularly described in claim 9".

Column 9,
Line 8, delete "(d" and insert -- $\delta d$ --.
Line 34, delete "$\theta dm \approx (\Psi 2 - \Psi 1) 2 \approx (1/4) x X \tau s$" and insert
-- $\theta dm \approx (\Psi 2 - \Psi 1)/2 \approx (1/4) x X x \tau s$ --.

Column 10,
Line 43, insert "(5)" insert -- : --.
Line 47, delete "$\Psi 2 - \Psi 1 = O.5(2m-1)\tau s - (180º/p) = O.5 x (2x7-1) X7.5 - (180·4) = 3.75º$" and
insert -- $\Psi 2 - \Psi 1 = 0.5(2m-1)\tau s - (180º/p) = O.5 x (2x7-1) X7.5 - (18O/4) = 3.75º$ --.

Column 11,
Line 21, after "windings." begin new paragraph.

Column 12,
Line 37, delete "2;" and insert -- $\alpha 2$; --.

Column 13,
Line 53, delete "claim 5" and insert -- claim 6 --.

UNITED STATES PATENT AND TRADEMARK OFFICE
CERTIFICATE OF CORRECTION

PATENT NO. : 6,597,079 B2
DATED : July 22, 2003
INVENTOR(S) : Miyashita et al.

It is certified that error appears in the above-identified patent and that said Letters Patent is hereby corrected as shown below:

Column 16,
Line 30, delete "claim 10" and insert -- claim 15 --.
Line 42, delete "θd0" and insert -- δd0 --.

Signed and Sealed this

Tenth Day of August, 2004

JON W. DUDAS
*Acting Director of the United States Patent and Trademark Office*